Patented Jan. 17, 1950

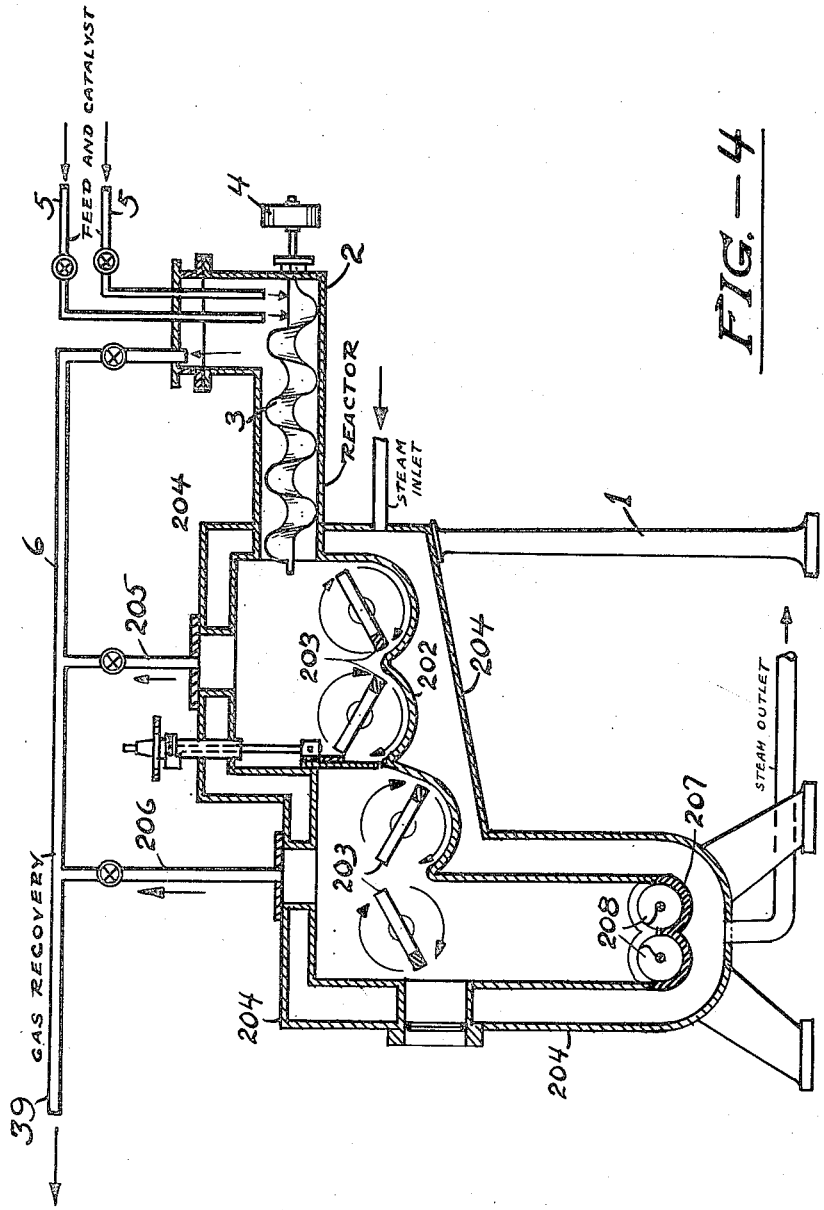

2,494,588

UNITED STATES PATENT OFFICE 2,494,588

EXTRUDER REACTOR

Arthur C. Skooglund, Clark Township, Union County, N. J., assignor to Standard Oil Development Company, a corporation of Delaware Application December 1, 1943, Serial No. 512,444

2 Claims. (Cl. 23—285)

This invention relates to process and apparatus for the low temperature polymerization of olefinic substances, and it more particularly relates to the process and apparatus for the continuous low temperature polymerization of olefins in which means are provided for separating the polymer from the recycle stream without loss of recycle material and for reducing fire and industrial poisoning hazards otherwise inherent in unconfined hydrocarbon vapors.

Isobutylene and mixtures containing isobutylene polymerize readily at low temperatures in the presence of an active halide catalyst into very high molecular weight plastic, elastic, rubber-like substances. This polymerization reaction is conveniently conducted at temperatures ranging from $-10°$ C. to $-100°$ C. or even lower, preferably within the temperature range of $-40°$ C. to $-80°$ C.; the reaction mixture preferably contains as the major polymerizable constituent, an isoolefin such as isobutylene. It also may contain in addition substantial portions of other olefins, diolefins, diluents, refrigerants, etc. Various low boiling liquids such as liquid propane, liquid ethylene, or liquid ethane are preferably used as refrigerants; various other diluents such as propyl, ethyl or methyl chloride, and other similar substances are also suitable. The polymerization reaction may be conducted as a batch operation, but great difficulty is encountered in recovering the various refrigerants, diluents and unpolymerized reactants, since most of these are gases at room temperature and even at temperatures only slightly above the reaction temperature used. These characteristics of the substances making up the reaction mixture, together with the solid character of the final product, make it exceedingly difficult to separate the polymerized product from the reaction mixture without the loss of undesirable large portions of the gaseous diluent-refrigerant and the development of a serious fire hazard and industrial poisoning hazard which otherwise would arise when substantial quantities of gaseous hydrocarbons are set free in a room. Such hydrocarbons yield combustible or explosive mixtures with air, when more than a very small percentage of the hydrocarbon is present, and at concentrations below the explosive or combustible range, they may still cause serious hazard of industrial poisoning.

The present invention provides a new type of reactor with means for separating and recovering the solid polymer formed and the volatilized gaseous portions of the reactant mixture, substantially without loss of any of the volatilized diluent-refrigerant or reactant substance; thereby avoiding the loss of valuable materials and the development of fire or industrial poisoning hazards.

Broadly, the apparatus of the present invention comprises a reaction vessel in combination with an extruder in which the reaction vessel contains screws similar to or forming a part of the extruder mechanism, with the screws operating directly in the polymerizable mixture. The apparatus is preferably tightly closed with solid covers and is provided with supply pipe lines for the delivery of the various component parts of the reaction mixture to the reactor, and further with discharge lines for the transfer of volatilized portions of the mixture to recycle equipment in which the mixed gases are fractionated, cooled and condensed for reuse as portions of a further quantity of reaction mixture.

The apparatus may consist either of a single vessel containing a screw which acts simultaneously as the reaction vessel and extruder, or it may consist of a reaction vessel provided with a screw and having a second or plasticating section provided with a second screw for degassing the polymer prior to extruding. Instead of the plasticating screw, the reaction vessel may be followed by a series of cascade kneaders for degassing the polymer.

Fig. 1 is a side view in elevation of one embodiment of the polymerization reactor according to this invention.

Figs. 2 and 2—a together show the flow of material from the polymerization reaction and the recovery of volatile material from the solid polymer.

Fig. 4 is another embodiment of the invention using kneaders for degassing the polymer.

Figure 1:
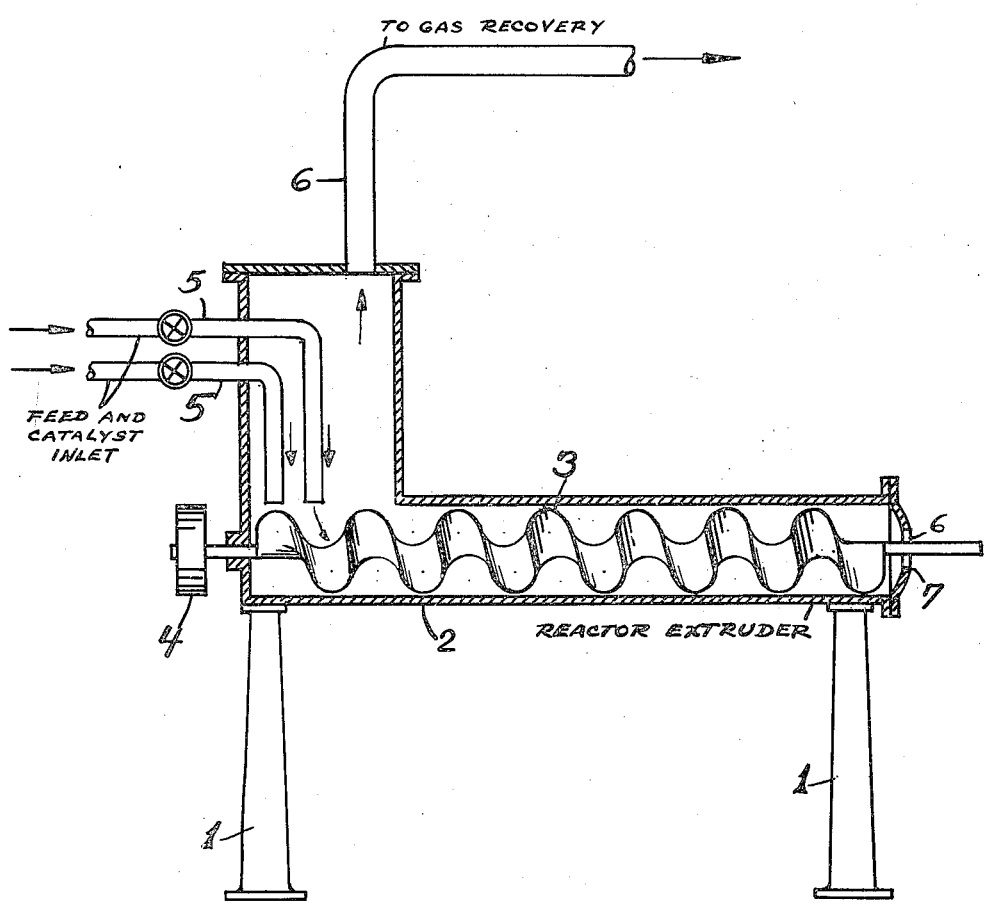

According to one embodiment of the invention, isobutylene is reacted in a closed, gas-tight reactor containing an extruder screw and supply lines for the various components of the reaction mixture, discharge pipes for the removal of the vaporizable constituents and an outlet for the discharge of solid polymer. The polymerization reaction liberates relatively very large quantities of heat, which are absorbed by the diluent-refrigerant, usually liquid ethane or liquid ethylene present in the reaction mixture. The reaction is rapid and the heat of reaction volatilizes a major portion to practically all of the diluent-refrigerant. During the reaction practically all of the isobutylene is converted into solid polymer which is transferred by the blades of the screw through an extruder plate. Being in a confined space, the polymer after its formation cannot escape and is thus moved away from the reaction zone by means of the revolving screw. As well as acting as a conveyor, the screw will work the material and discharge it nearly free of gas. During this process the solid polymer is cut and broken into relatively small granules or crumbs and any residual quantities of the diluent-refrigerant and any unpolymerized reactants are largely drawn off from the solid polymer. Finally, the solid polymer is discharged through the extruder nozzle as a solid stream which seals the discharge from the reactors against leakage of volatalized gas, thereby avoiding the loss and wastage of valuable materials and the development of a fire hazard from admixture of these hydrocarbon gases with air, and avoiding the development of an industrial poisoning hazard, since most of these substances have anaesthetic and poisonous properties. In addition, this permits the return of the volatilized gaseous materials to an appropriate purifying and condensing device for reuse in the preparation of further portions of the polymer.

Referring to the figures, 1 is a base upon which a chamber 2 is mounted. Within chamber 2 is a screw 3 mounted upon a shaft to which a pulley wheel 4 is secured. The pulley wheel is driven by any suitable driving means (not shown). Chamber 2 is also provided at its beginning end with inlet pipes 5 for the reactants and with outlet pipe 6 for the removal of separated gases and vapors. Solid polymer is discharged through extruder plate 7.

Figure 2:
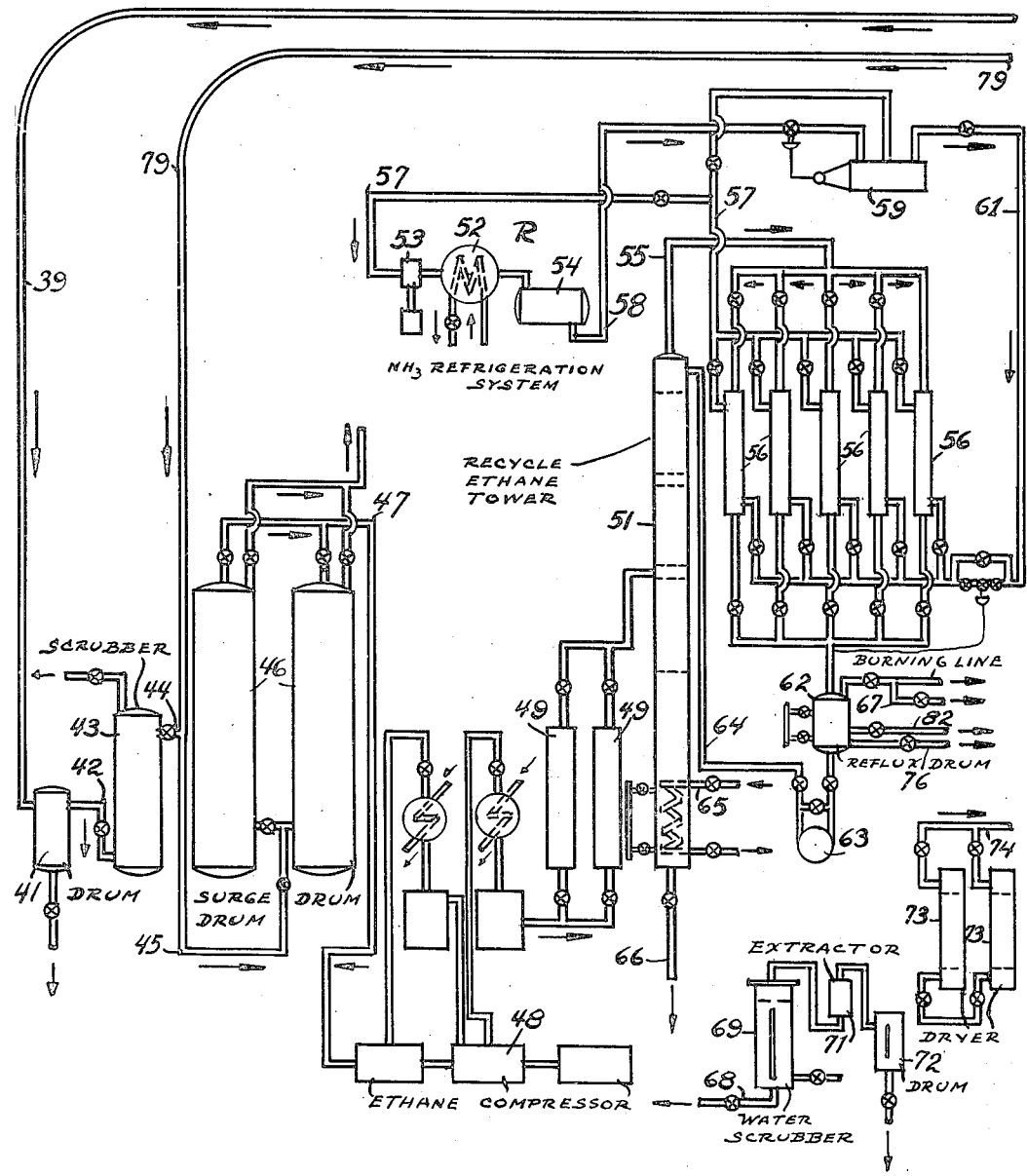
Figure 2A:
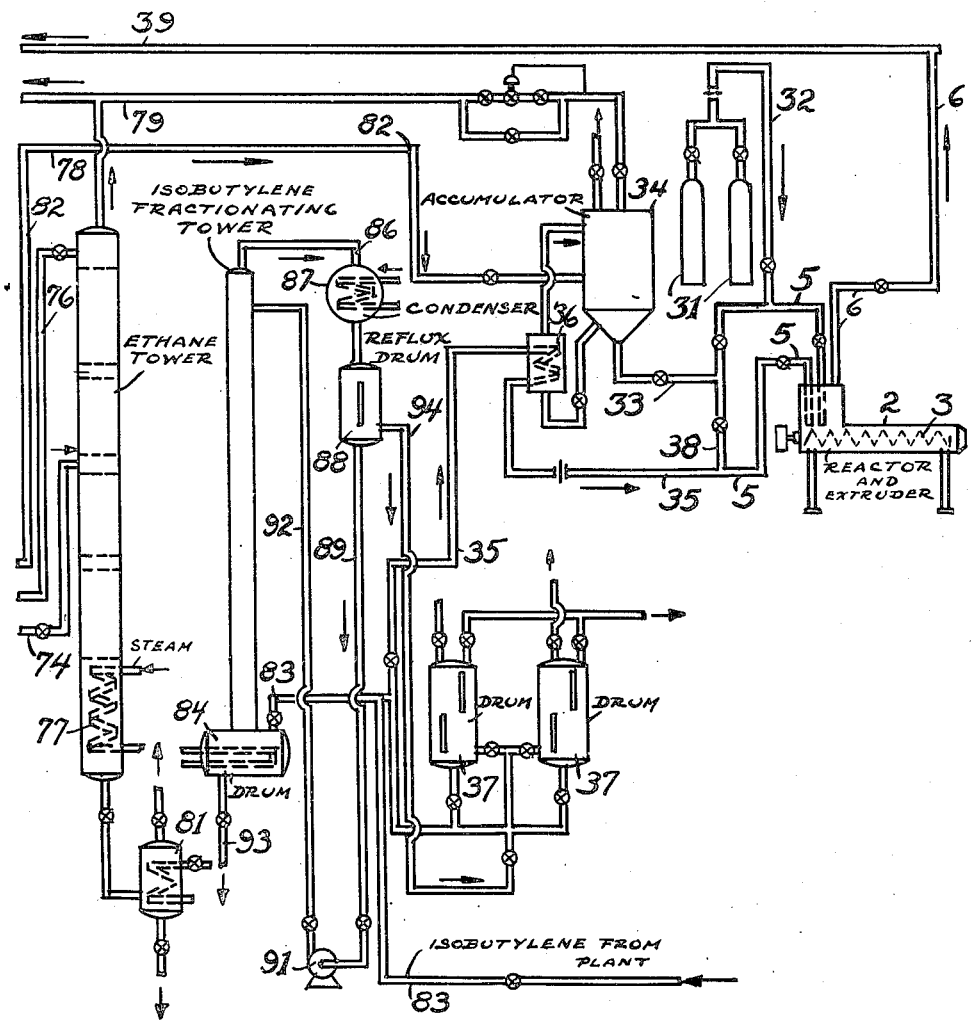

Referring to Figs. 2 and 2—a, the screw reactor 2 shown at the right of Fig. 2—a with the gas outlet pipes 6 and the supply pipes 5, is connected to a source of boron trifluoride in the form of cylinders of the liquefied gas 31 which are connected through a pipe and valve system 32 to one of the supply pipes 5, which is also connected by a supply pipe 33 to a storage reservoir 34 containing a supply of liquid diluent-refrigerant, preferably liquid ethylene. A second of the supply pipes 5 is connected by way of supply pipe 35 and cooler 36 to storage drums 37 containing liquid isobutylene. A by-pass supply line 38 with control valve as indicated leads from the pipe 33 to the pipe 35 for the delivery of liquid diluent-refrigerant to mix with the liquid isobutylene preparatory to delivery into the screw reactor 2. The gas outlet pipes 6 are connected to a transfer pipe line 39 which leads, as shown in Fig. 2, to a scrubber drum 41 for the removal of any liquid constituents. From the drum 41 a second pipe line 42 leads to a scrubber device 43 which consists of a closed container charged with calcium oxide which serves to remove from the effluent any residual traces of boron trifluoride. From this drum 43, the ethylene vapor is discharged through pipe lines 44 and 45 to storage or surge drums 46. From the drums 46 a pipe line 47 leads the effluent, which is largely gaseous ethylene free from boron trifluoride but contains small quantities of isobutylene, and on occasion small quantities of isobutylene dimer and trimer (and if diolefins are used in the reaction mixture, it may contain small quantities of the diolefins), to a compressor or system 48 in which the gas is compressed and cooled preparatory to liquefaction. The compressed gas is passed through purifying towers 49 containing solid calcium chloride for the removal of all traces of moisture, to a fractionating column 51. The fractionating column 51 operates under a substantial pressure, preferably in the neighborhood of 400 lbs. per square inch.

There is associated with the tower 51 a reflux condenser system R consisting of a condenser member 52, preferably cooled by ammonia refrigeration, together with a circulating pump 53 and a storage drum 54. The relatively pure ethylene leaves the column 51 by way of a pipe line 55, which is associated with a series of storage containers 56. A second pipe line 57 is connected to the pipe line 55 through the pipe manifold shown, and is further connected through a control valve to the pump 53, the condenser 52 and the storage tank 54. A pipe line 58 leaves from the storage drum 54 to an auxiliary flow drum 59 and a delivery pipe line 61 to the lower pipe manifold system shown associated with the storage drums 56. Liquid ethylene condensed under the operating pressure in the condenser 52 is thereby delivered to a storage drum 62 from which a portion is removed by the pump 63 and sent by way of pipe line 64 to the top of the fractionating column 51 to provide the necessary liquid reflux. A steam coil 65 vaporizes a portion of the reflux at the bottom of the fractionating tower 51, and a portion of the heavy ends is discharged through an outlet pipe 66 from which it may be sent to the waste gas lines. Another portion of the ethylene, including any traces of hydrogen, or other more difficultly condensable gases may be discharged through the pipe line 67 to a burning line or to the waste gas line as desired.

A supply of impure ethylene (from the refinery fractionating column) in the form of a C₂ cut is received through pipe line 68, passed through a water scrubber 69, through a vapor extractor 71, through a knock-out drum 72 to drier cylinders 73 which are filled with solid calcium chloride to remove all traces of moisture. From the drier drum 73 the raw ethylene is passed through a pipe line 74 to the ethane tower 75. A substantial portion of cold liquid purified ethylene is delivered from the storage drum 62 by way of the supply pipe line 76 to the top of the ethane tower 75 to form a reflux. A steam coil 77 is provided in the bottom of the tower 75 to vaporize a portion of the reflux. By this arrangement, substantially pure ethylene (with small quantities only of ethane) is delivered through the pipe line 78 to the pipe line 79 leading to the pipe line 45 and the ethylene storage drums 46. The heavy ends from the tower 75 are delivered to a flash drum 81 containing a steam coil which converts the liquid material into gas at approximately room temperature, for return to the refinery fuel lines (to avoid the development of low temperatures which would freeze up the lines). Simultaneously, a major portion of the liquid ethylene is delivered from the storage drum 62 through a pipeline 82 to the storage drum 34 for use in the polymerization reaction.

The nearly pure isobutylene is delivered from the refinery through pipe line 83 to the drum 84 of a fractionating column 85. The nearly pure isobutylene is received from the refinery at approximately atmospheric temperature under a pressure of 40 to 50 pounds, depending on the atmospheric temperature. A portion of the isobutylene is volatilized in the drum 84 and rises through the fractionating column 85 to the pipe line 86 by which it is conducted to condenser 87 where it is condensed and delivered to a reflux drum 88. From the reflux drum 88, a portion of the liquid isobutylene is taken from pipe 89 under the drive of a pump 91 and a second pipe line 92 to a point near the top of the tower 85 to provide the necessary reflux. The heavy ends are discharged through a pipe 93 from the drum 84 to storage or to a flash drum or to other convenient means for disposal. Another portion of the liquid isobutylene is taken from the drum 88 through pipe line 94 to the storage drums 97 in which the liquid isobutylene is stored, and from which it is delivered from the pipe 35 to the polymerization reactor 2 as above described.

In the operation of the invention, liquid ethylene is withdrawn from the tank 34 through the pipes 33 and 5 into the reactor 2 and allowed to volatilize therein until the entire reactor structure is cooled down to the desired low reaction temperature. During this cooling operation, the volatilized gas is discharged through the pipes 6 and 39 to the storage drum 41 and through the scrubber 43 to the drums 46. When the desired low temperature is reached, a further portion of the liquid ethylene is passed through the pipe 38 into the second pipe 5, and thereafter liquid isobutylene from the drums 37 is passed through the pipe 35 and the cooler 36 to the second pipe 5 and discharged into the reactor 2 adjacent the screw blades 3. Simultaneously with the delivery of the isobutylene-ethylene mixture to the reactor, boron trifluoride is delivered through the line 32 and mixed with and dissolved in the liquid ethylene from pipe 33. By this procedure there is thus discharged through the two pipes 5, simultaneous streams of isobutylene dissolved in liquid ethylene and boron trifluoride dissolved in liquid ethylene.

The polymerization reaction is a very rapid one, liberating a very substantial amount of heat of reaction, and thereby volatilizing the diluent-refrigerant at a relatively high rate of speed. The reaction is complete in a time interval varying from a few seconds to a very small number of minutes and accordingly, while a pool of the reactants is formed by the streams of material in the bottom of the reaction chamber, the reaction is so rapid that the contents of the reaction chamber consist mainly of the solid polymer with only very small amounts to negligible amounts of liquid remaining, and small amounts of liquid adhering to, and occluded in the solid polymer. The blades of screw 3 act to convey the polymer toward the extruder plate and simultaneously pulverize and break up the mass of polymer into moderately small granules and free it from most of the occluded and adhering liquid, the liquid being volatilized and discharged from the reactor. At the discharge the solid polymer is compacted into a solid mass filling the entire discharge nozzle with all of the gaseous and volatilized material derived from unpolymerized raw material and from the diluent-refrigerant squeezed out of the solid. Under these circumstances, an impervious plug of solid, but somewhat plastic, polymer fills the discharge outlet of the reactor and prevents the loss or leakage of any gaseous material, thereby sealing the discharge end of the system against loss of valuable materials and sealing the entire system against emergence of vapors which could produce a fire hazard or industrial poisoning hazard, yet permitting the simple and easy discharge of solid polymer product as rapidly as it is produced, after a series of purification steps to remove substantially all of the undesired and undesirable volatile material.

The emergent gases from the pipe 6 consist mainly of gaseous ethylene, but contain smaller quantities of gaseous isobutylene, still smaller quantities of boron trifluoride, and may in some instances contain some traces of isobutylene dimer or trimer, or both. The gaseous effluent is passed to the separatory drum 41 and the calcium oxide scrubber as shown in Fig. 2, where any traces of dimer or trimer and boron trifluoride are removed, leaving substantially only ethylene with minor traces of isobutylene. The ethylene is compressed, purified by fractionation as shown in Figs. 2 and 2—a, and is delivered to the storage drum 34 for reuse in the process.

The composition of the reaction mixture, previously mentioned, is subject to considerable variation. A preferred form for the making of the simple polyisobutylene consists of approximately one part by weight of liquid isobutylene with two and one-half to three parts by weight of ethylene, together with from 0.001 part by weight to 0.01 part of boron trifluoride as catalyst. That is, the amount of diluent-refrigerant required to absorb the heat of polymerization is from two and one-half to three times the amount of isobutylene present, and the amount of catalyst required ranges from one-tenth of one percent by weight of the amount of isobutylene to one percent by weight of the amount of isobutylene present.

When liquid ethane is used as the refrigerant approximately the same proportions of reactants are satisfactory. When liquid propane is used, approximately the same proportions of reactants are likewise satisfactory.

In the above paragraphs, it has been suggested that a simple mixture containing isobutylene only as a reactant may be used. It is possible, however, to use a considerable number of other mixtures. For instance, the isobutylene may be replaced by methyl ethyl ethylene as the reactant, and more than one olefinic substance may be present as a reactant. Especially there may be used diolefinic constituents such as butadiene, cyclopentadiene and dimethylbutadiene, as well as various other diolefinic substances. Likewise, other catalysts than boron fluoride may be used, such as for instance aluminum chloride dissolved in a simple solution in a low freezing solvent which does not form a complex with the aluminum chloride, such as ethyl or methyl chloride.

In preparing the respective components of the reaction mixture, the liquid isobutylene and the liquid ethylene may simply be mixed, preferably at the temperature set by the boiling point under atmospheric pressure of the ethylene since the isobutylene (and any other added olefinic materials) are readily soluble in the ethylene which serves as the diluent-refrigerant. Alternatively, the respective components of the reaction mixture may be delivered separately to the reactor, the isoolefin being delivered through one supply line, the diluent-refrigerant through another and the catalyst through a third. Again, the reactants and catalyst may be introduced through supply pipes entering the bottom of the reactor, if desired.

As pointed out above, the simple screw arrangement shown in 1 may be replaced by one in which the polymer is polymerized in one screw and then degassed in a plasticating section.

Figure 3:
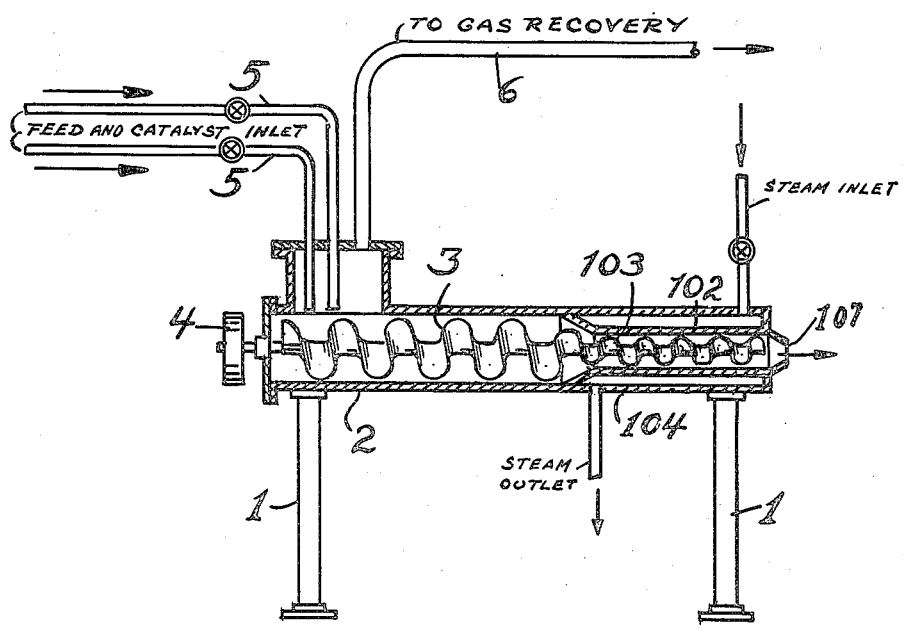
Fig. 3 is a side view in vertical section of an alternative embodiment of the device of the invention using a plasticating screw for degassing.

This embodiment is shown in Fig. 3. In this arrangement chamber 2 containing screw 3 is provided at its forward end with a portion 102 of slightly smaller cross section carrying a plasticating screw 103, the blades of which preferably have a different pitch from those of screw 3, such as a Gordon plasticating screw. It is preferable that this screw be provided with a larger clearance between the blades and the walls of the chamber than is the case in the reactor 2. The plasticating section 102 is also provided with steam jacket 104 to aid in degassing the polymer.

The reactants may be delivered to the reactor in the form of a solution of isobutylene in ethylene and a solution of boron fluoride in ethylene as in the previously described embodiment, or the ethylene and the isobutylene may be delivered simultaneously to the top of the reactor around the reactor screws, while the gaseous boron fluoride is bubbled through the mixture from an inlet at the bottom of the reactor beneath the screws. The polymer is carried forward into the smaller portion 102, while the heat provided by the steam jacket 104 aids the screws 103 in driving out all traces of volatilizable material from the solid polymer. The blades of extruder screws 103 compact the solid polymer into a dense, coherent mass which is discharged from the extruder nozzle 107 as a solid stream which simultaneously forms a plug to prevent the loss or leakage of any gases or liquid material just as described above in connection with the first embodiment.

In Fig. 4 is shown a third embodiment of the invention in which polymer from the screws 3 is degassed in a cascade kneader section 202 and discharged through extruder 207. Located in section 202 are kneading and mixing blades 203 operating in pairs as shown. A suitable type of kneader is that described and illustrated in co-pending application, Serial No. 386,967, filed December 7, 1940, in the name of M. D. Mann, Jr., now U. S. Patent 2,435,228. The kneaders, however, are preferably provided with a steam jacket 204 to aid in the degassing. Any number of kneader sections may be used as desired, but for the sake of simplicity only two are shown in the drawings. The last kneader discharges into extruding device 207 having extruder screws 208. Discharge lines 205 and 206 are provided, in addition to line 6, for removing separated gases or vapors from the polymer being degrassed.

By the device of this invention, there is thus provided a new polymerization mechanism by which the polymerization reaction is conducted in a sealed reactor from which the solid polymer is removed through an extruder which forms a solid seal of polymer to prevent the loss of gaseous or liquid portions of the reaction mixture; and the volatilized portions of the reaction mixture are recovered in a closed system and separated into pure constituents for reuse and recycling.

The nature and objects of the present invention having thus been set forth and a specific embodiment of the same given, what is claimed as new and useful and desired to be secured by Letters Patent is:

1. An apparatus for producing solid polymers of isobutylene which comprises an extruder casing having a bore possessing two portions in series, the first portion having a larger diameter than the other, the bore being fitted with an extruder head at the small-diameter discharge end, a gas-tight enlarged chamber having a closed top and communicating with the bore in the vicinity of the large-diameter end thereof, an extruder screw located within the bore and having two portions adapted to operate in the respective portions of the bore and adapted to transport plastic material from the large-diameter portion to the small-diameter portion of the bore, the screw portion located within the small-diameter portion of the bore having a smaller pitch than the screw portion located within the large-diameter portion of the bore, means for revolving the screw, a jacket surrounding the portion of the casing which contains the small-diameter bore and adapted to steam-heat said small-diameter bore, a pair of supply pipes in said enlarged chamber which terminate in close proximity to each other and to the screw, and a duct passing through the closed top of said enlarged chamber and adapted to conduct gases to a condensing and recovery tower.

2. An apparatus according to claim 1 wherein the distance between the discharge ends of the supply pipes is not substantially greater than the distance between two adjacent threads of the extruder screw.

ARTHUR C. SKOOGLUND.

REFERENCES CITED

The following references are of record in the file of this patent:

UNITED STATES PATENTS

| Number | Name | Date |
| --- | --- | --- |
| 701,957 | Staley | June 10, 1902 |
| 786,125 | Hinkle | Mar. 28, 1905 |
| 1,156,096 | Price | Oct. 12, 1915 |
| 1,320,718 | Steinle | Nov. 4, 1919 |
| 1,614,526 | Lambie et al. | Jan. 18, 1927 |
| 2,063,266 | Pape et al. | Dec. 8, 1936 |
| 2,078,565 | Durst et al. | Apr. 27, 1937 |
| 2,131,905 | Strezynski | Oct. 4, 1938 |
| 2,209,746 | Ebert | July 30, 1940 |
| 2,435,228 | Mann | Feb. 3, 1948 |